US009715061B2

United States Patent
Huang et al.

(10) Patent No.: US 9,715,061 B2
(45) Date of Patent: Jul. 25, 2017

(54) DISPLAY AND BRACKET FOR BACKLIGHT MODULE

(71) Applicant: AU Optronics Corp., Hsin-Chu (TW)

(72) Inventors: Chun-Chi Huang, Hsin-Chu (TW); Cheng-Wei Chang, Hsin-Chu (TW); Ping-Chang Yang, Hsin-Chu (TW); Shu-Ting Jhuang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 185 days.

(21) Appl. No.: 14/673,820

(22) Filed: Mar. 30, 2015

(65) Prior Publication Data

US 2015/0301273 A1  Oct. 22, 2015

(30) Foreign Application Priority Data

Apr. 16, 2014  (TW) .............................. 103113913 A (51) Int. Cl.
  *F21V 7/04*  (2006.01)
  *F21V 8/00*  (2006.01)

(52) U.S. Cl.
  CPC ......... *G02B 6/0091* (2013.01); *G02B 6/0088* (2013.01)

(58) Field of Classification Search
  CPC ........................... G02B 6/0091; G02B 6/0088
  See application file for complete search history.

(56) References Cited

U.S. PATENT DOCUMENTS

| | | |
|---|---|---|
| 6,950,154 B2 | 9/2005 | Lee |
| 8,582,046 B2 | 11/2013 | Lee |
| 2010/0007816 A1* | 1/2010 | Lee ...................... G02B 6/0088 349/58 |
| 2012/0320623 A1* | 12/2012 | Wada ................... G02B 6/0088 362/602 |
| 2014/0152940 A1* | 6/2014 | Wang ................... G02B 6/0011 349/62 |

FOREIGN PATENT DOCUMENTS

| | | |
|---|---|---|
| CN | 1461965 A | 12/2003 |
| CN | 101630088 A | 1/2010 |
| TW | 200307155 | 12/2003 |
| TW | M274547 | 9/2005 |

* cited by examiner

*Primary Examiner* — Evan Dzierzynski
(74) *Attorney, Agent, or Firm* — Locke Lord LLP; Tim Tingkang Xia, Esq.

(57) ABSTRACT

In a backlight module of a display, a plurality of optical films has positioning protrusions disposed in a positioning slot of a plastic frame for correct installation of the optical films on a light guide plate. One or more middle optical films further include a fixing protrusion at the side corresponding to the light source and an existing opening formed by bending a system bracket out of a holder is provided for placement of the fixing protrusion of the middle optical films. A double-sided adhesive tape disposed between a display panel and the holder is further utilized for securing the fixing protrusion such that the middle optical films can be securely fixed and not falling apart during an impact test or a falling test.

14 Claims, 7 Drawing Sheets

DISPLAY AND BRACKET FOR BACKLIGHT MODULE

BACKGROUND OF THE INVENTION

1. Field of the Invention

The invention relates to a display, and more particularly, to a display having structure for securing middle films at the light source side.

2. Description of the Prior Art

Flat panel display usually includes a backlight module and a panel module in that the backlight module is disposed under the panel module for providing light for the display of the display. Most backlight modules are designed to have a plurality of optical films disposed on the light guide plate, to unify, enhance, and polarize the lights emitted from the light guide plate. These optical films are positioned by a plastic frame surrounding the light guide plate and mainly for supporting the panel module. Slots are formed at the sides, which are not the sides facing the light source, of the plastic frame for position purpose and the optical films have positioning protrusions corresponding to the slots. As the optical films are disposed on the light guide plate, the positioning protrusions are placed in the slots of the plastic frame for correctly positioning the optical films with the light guide plate.

The slots of the plastic frame not only position the optical films when the positioning protrusions are placed in the slots, but the positioning protrusions are also securely fixed in the slots. However, it is always the case that only the topmost and the bottommost optical films can be practically secured. The topmost optical film is directly adhered to the side of the plastic frame via a tape, while the bottommost optical film is attached to the bottom of the slot of the plastic frame via a double-sided adhesive tape. As for the middle optical film(s), however, no existing securing solution is provided but to just leave the middle optical film(s) therebetween. It is quite possible that when undergoing an impact test or a falling test, the tape that secures the topmost optical film may loose, causing the positioning protrusions of the middle optical films to fall apart from the positioning slot and the middle optical films are having displacement.

SUMMARY OF THE INVENTION

To solve the potential displacement issue of the films due to the falling apart from the positioning slot, a specific solution is provided in the invention.

An embodiment of the invention provides a display including a display panel and a backlight module. The display panel is disposed on the backlight module. The backlight module includes a light guide plate having a light source side, a light source disposed along the light source side, a holder, and a first optical film disposed between the display panel and the light guide plate. The holder includes a bottom plate, a side plate, a top plate, and a system bracket. The light source and the light guide plate are disposed on the bottom plate. The side plate is connected to the bottom plate and facing the light source side of the light guide plat. The top plate is connected to the side plate and disposed corresponding to the bottom plate. The top plate, the side plate, and the bottom plate form a containing room where the light source and the light source side of the light guide plate are contained therein. The top plate includes an opening. The system bracket is connected to the side plate and corresponding to the opening. The system bracket extends toward a direction away from the light guide plate. The first optical film includes a fixing protrusion disposed in the opening of the top plate.

According to the embodiment of the invention, the system bracket is formed by bending a portion of the top plate toward the direction away from the light guide plate and the opening is formed at the position of the portion of the top plate.

According to the embodiment of the invention, the width of the system bracket near the side plate is not more than the width of the opening near the side plate.

According to the embodiment of the invention, the display further includes a plastic frame disposed inside the holder and surrounding the light guide plate. The plastic frame supports the display panel and includes a positioning slot at a side not facing the light source side.

According to the embodiment of the invention, the plastic frame includes a top frame covering the top plate and exposing the opening.

According to the embodiment of the invention, the backlight module further includes a second optical film disposed between the display panel and the first optical film. The second optical film includes a second positioning protrusion disposed in the positioning slot.

According to the embodiment of the invention, the first optical film includes a first positioning protrusion disposed in the positioning slot.

According to the embodiment of the invention, the backlight module further includes a second optical film and a third optical film. The second optical film is disposed between the display panel and the first optical film and the third optical film is disposed between the first optical film and the light guide plate. The third optical film, the first optical film, and the second optical film stack in a series on the light guide plate, wherein the second optical film includes a second positioning protrusion and the third optical film includes a third positioning protrusion respectively disposed in the positioning slot.

According to the embodiment of the invention, the second positioning protrusion of the second optical film is secured in the positioning slot via a tape and the third positioning protrusion of the third optical film is adhered to the bottom of the positioning slot via a double-sided adhesive tape.

According to the embodiment of the invention, the display further includes a double-sided adhesive component disposed between the display panel and the top plate, the double-sided adhesive component securing the display panel with the top plate and the fixing protrusion.

The display provided in the embodiments of the invention utilize the existing opening formed by bending the system bracket out of the holder at the side facing the light source for placement of the fixing protrusion of the middle optical films and further utilizes the existing double-sided adhesive tape disposed between the display panel and the holder for securing the fixing protrusions such that the middle optical films can be securely fixed and not falling apart during the impact test or the falling test.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical connection. Thus, if a first device is coupled to a second device, that connection may be through a direct electrical connection, or through an indirect electrical connection via other devices and connections.

Figure 1:
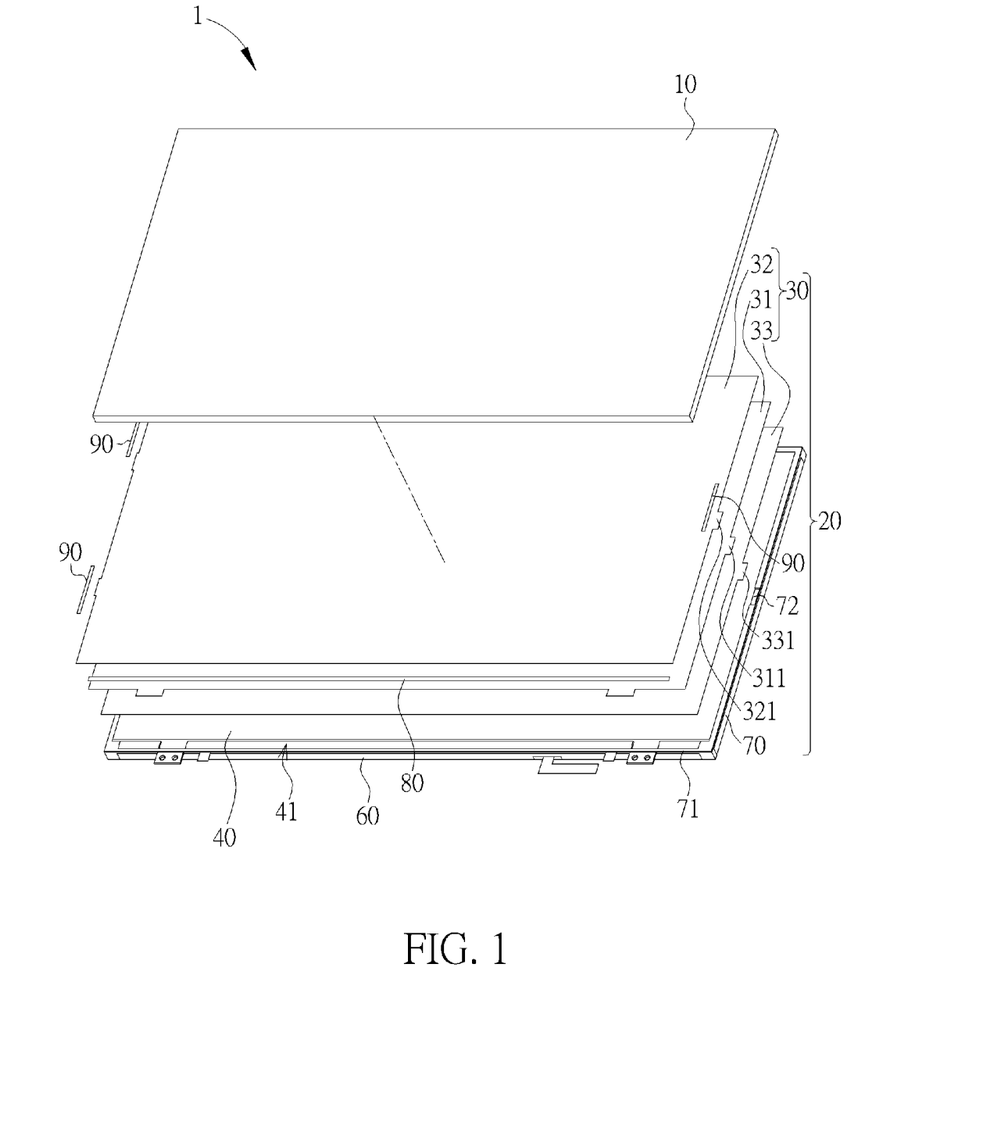
FIG. 1 is an illustration showing an exploded view of a display according to an embodiment of the invention.

Please refer to FIG. 1. FIG. 1 is an illustration showing an exploded view of a display according to an embodiment of the invention. The display 1 includes a display panel 10 and a backlight module 20, in which the display panel 10 is disposed on the backlight module 20. The display 1 can be an LCD module and the display panel 10 can be an LCD panel. The backlight module 20 includes a light guide plate 40, a light source 50 (referring to FIG. 2), a holder 60, a plastic frame 70, and optical films 30. The light guide plate 40 has a light source side 41 and the light source 50 is disposed along the light source side 41. In the embodiments of the invention, the backlight module 20 can be a side-type backlight module 20 with light emitting diodes as the light source 50, for example side illuminating light emitting diodes, whereas a CCFL light source may also be implemented as the light source 50. A light-shielding tape 52 can be disposed above the light source 50 and the light guide plate 40. The holder 60, as a supporting base of all other components of the backlight module 20, can be a metal holder that has a holding and fixing structure at a side corresponding to the light source side 41 of the light guide plate 40. The plastic frame 70 is disposed inside the holder 60 and is utilized for supporting the display panel 10. The light source 50 and the light guide plate 40 are disposed on the holder 60 with the plastic frame 70 surrounding the light guide plate 40. The optical films 30 include a first optical film 31, a second optical film 32, and a third optical film 33. In this embodiment, the third optical film 33, the first optical film 31, and the second optical film 32 are stacked in a series on the light guide plate 40. In other words, the third optical film 33 is disposed on the light guide plate 40, the second optical film 32 is disposed at the top of the backlight module 20 and directly facing the display panel 10, and the first optical film 31 is a middle film disposed between the second optical film 32 and the third optical film 33.

Figure 2:
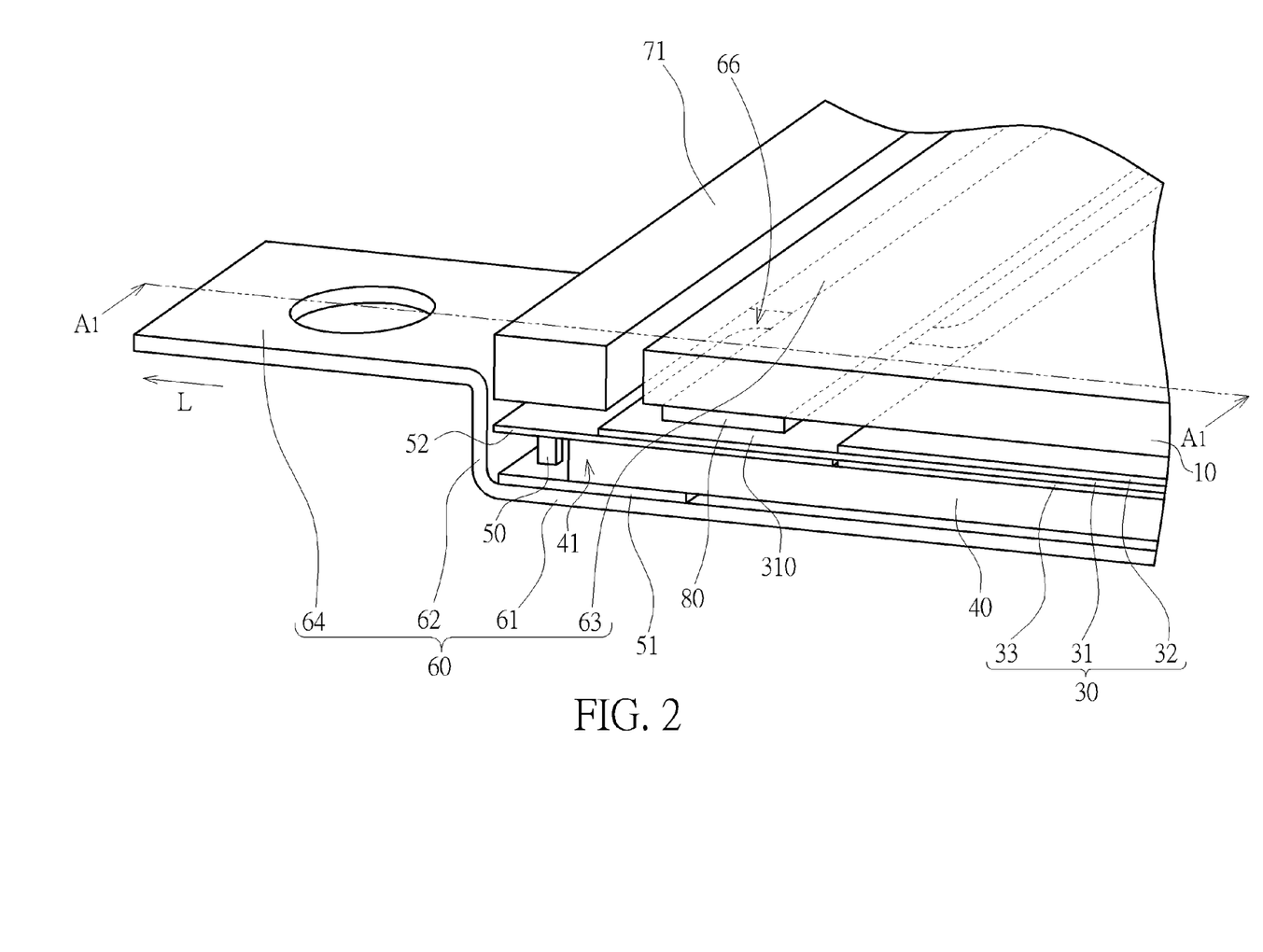
FIG. 2 is an illustration of a partial view of a light source side of the display.
Figure 3:
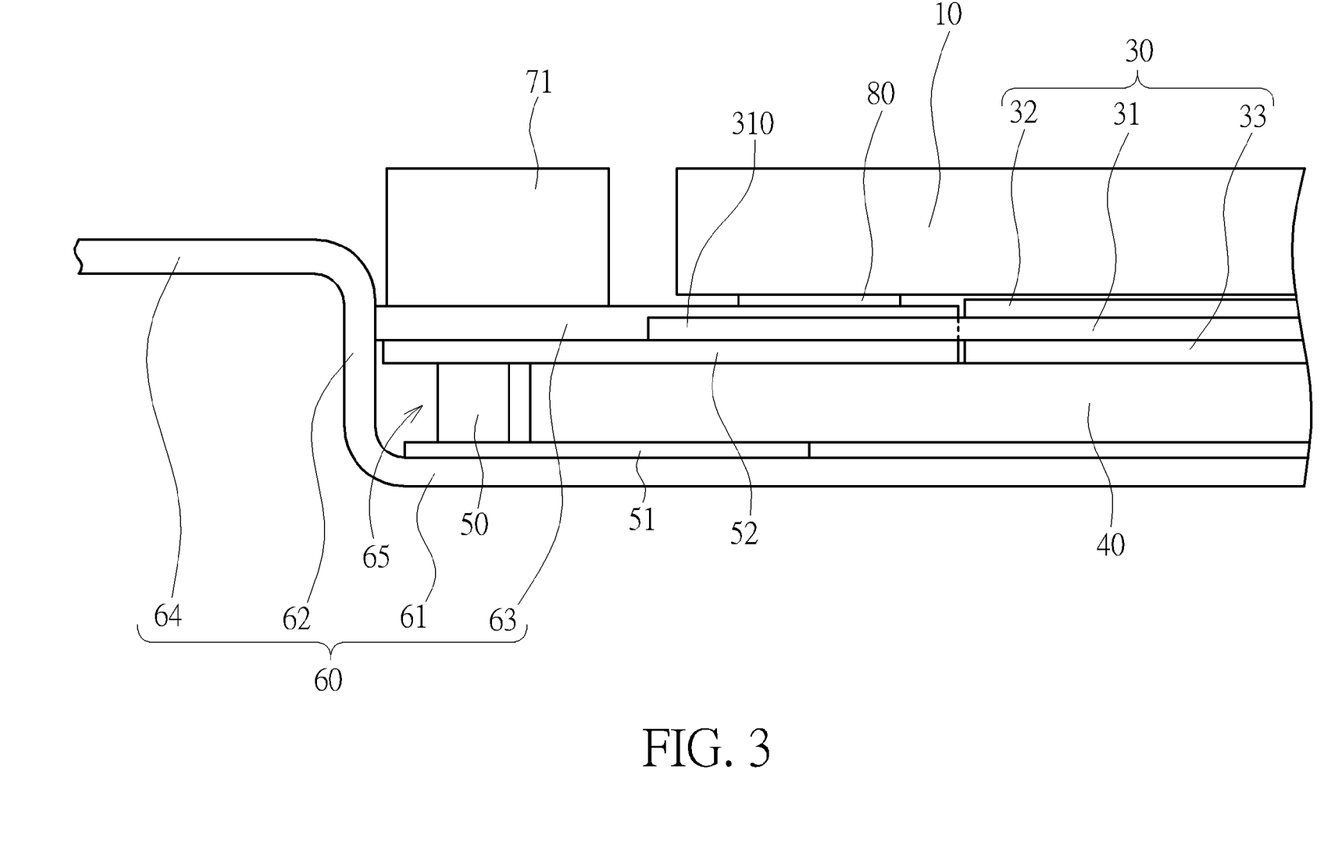
FIG. 3 is an illustration of a cross-sectional view along the A1 line in FIG. 2.

Please refer to FIG. 2 and FIG. 3. FIG. 2 is an illustration of a partial view of a light source side of the display and FIG. 3 is an illustration of a cross-sectional view along the A1 line in FIG. 2. To improve readability of the figure, the profile lines of each component in FIG. 3 are omitted and please also notice that the top plate 63 is not located at the cross section of A1 line. The holder 60 has a holding and fixing structure at the side corresponding to the light source side 41 of the light guide plate 40. In FIG. 2 and FIG. 3, the holder 60 includes a bottom plate 61, a side plate 62, a top plate 63, and at least one system bracket 64. The bottom plate 61 is the bottom structure of the holder 60 where the light source 50 (along with a flexible circuit board 51) and the light guide plate 40 are disposed thereon. The side plate 62 is connected to the bottom plate 61 and faces the light source side 41 of the light guide plate 40, wherein the bottom plate 61 is a horizontally extending portion and the side plate 62 vertically extends upward at a side of the bottom plate 61. The top plate 63 is connected to the side plate 62 and disposed corresponding to the bottom plate 61, i.e., the top plate 63 is also a horizontally extending portion and substantially parallel with the bottom plate 61. The top plate 63, the side plate 62, and the bottom plate 61 form a containing room 65 adjacent to the light source side 41 of the light guide plate 40 and the light source 50 and the light source side 41 of the light guide plate 40 are contained in the containing room 65. Hence, the holder 60 provides the holding structure for the light source 50 and the light source side 41 of the light guide plate 40.

Figure 4:
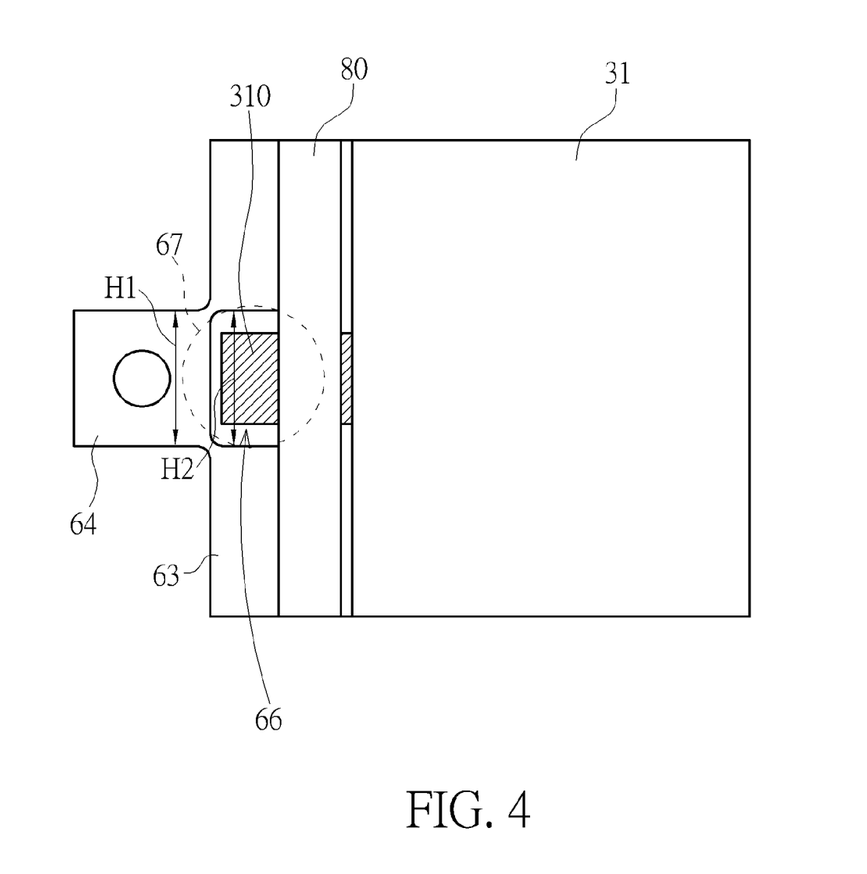
FIG. 4 is an illustration of a partial top view of the holder and the first optical film at the light source side.

Please keep referring to FIG. 2 and FIG. 3. The system bracket 64 of the holder 60 is connected to the side plate 62 of the holder 60 and extends toward a direction away from the light guide plate 41. It can be shown in FIG. 2 that the system bracket 64 extends horizontally along direction L. The system bracket 64 is utilized for fixing the holder 60, along with the whole backlight module 20 and the display panel 10 disposed on the backlight module 20, to an exterior housing or a system component that encases the display 1 in such a way that the holder 60 provides the fixing function. As stated earlier, the holder 60 is preferably a metal holder, which is suitable for being bent over or deformed properly. In other words, the system bracket 64 according to the invention is a portion 67 (as shown in FIG. 4) bent over from the top plate 63 and extending toward the direction away from the light guide plate 40, where an opening 66 is formed at the very position where the portion 67 originally occupied at the top plate 63. Hence, the position of the opening 66 corresponds to the system bracket 64 accordingly. Additionally, the plastic frame 70 includes a top frame 71 covering the top plate 63 and exposing a portion of the opening 66.

Please refer to FIG. 2, FIG. 3, and FIG. 4. FIG. 4 is an illustration of a partial top view of the holder and the first optical film at the light source side. The display 1 further includes a double-sided adhesive component 80, which may be a double-sided tape, disposed between the display panel 10 and the top plate 63 and utilized for securing the display panel 10 with the top plate 63. In the invention, the first optical film 31 includes a fixing protrusion 310 extending into the opening 66 of the top plate 63 and exposed by the opening 66 of the top plate 63. When the double-sided adhesive component 80 is disposed between the display panel 10 and the top plate 63, the fixing protrusion 310 of the first optical film 31 is also secured by the double-sided adhesive component 80 such that the display panel 10 and the top plate 63 along with the fixing protrusion 310 may be well secured with one another. As an existing component, the double-sided adhesive component 80 may be directly used to secure the fixing protrusion 310 of the first optical film 31 at the opening 66. No further component is needed for the purpose of securing the first optical film 31. Additionally, a shielding material may further be disposed on the fixing protrusion 310 of the first optical film 31 or the fixing protrusion 310 may be made of dark material so that light leak from the light source 50 can be prevented.

It should be noted that, by referring to FIG. 4, the width H1 of the system bracket 64 near the side plate 62 (also referring to FIG. 3 for the side plate 62) is not more than the width H2 of the opening 66 near the side plate 62, or the width of the system bracket 64 falls within the range of the width of the opening 66.

Figure 5:
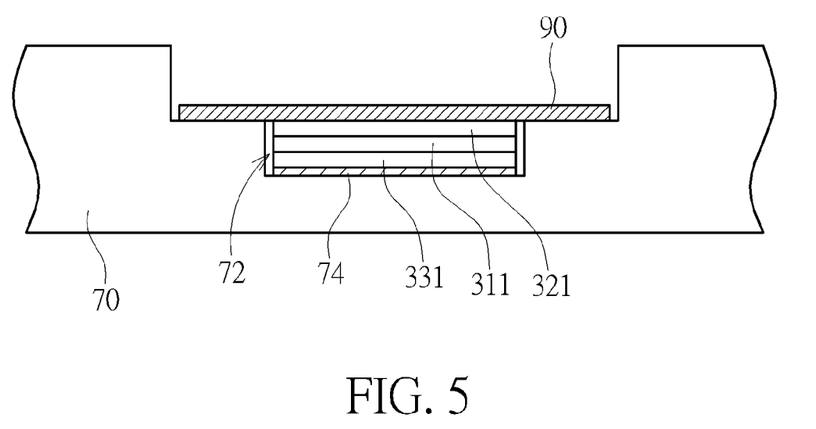
FIG. 5 is an illustration showing a partial cross-sectional view of the plastic frame and the optical films of the backlight module at the non-light source side.

Please refer to FIG. 1 and FIG. 5. FIG. 5 is an illustration showing a partial cross-sectional view of the plastic frame and the optical films of the backlight module at the non-light source side. The plastic frame 70 includes at least a positioning slot 72 at the sides other than the side facing the light source side 41 of the light guide plate 40 and the positioning slot 72 is adapted for positioning during the assembly of the optical films 30. As mentioned, in the embodiment shown in FIG. 1 and FIG. 5, the optical films 30 include, from bottom to top, the third optical film 33, the first optical film 31, and the second optical film 32. The first optical film 31 has at least a first positioning protrusion 311 at the sides corresponding to the non light source sides of the plastic frame 70, the second optical film 32 has at least a second positioning protrusion 321 at the sides corresponding to the non light source sides of the plastic frame 70, and the third optical film 33 has at least a third positioning protrusion 331 at the sides corresponding to the non light source sides of the plastic frame 70. The third positioning protrusion 331, the first positioning protrusion 311, and the second positioning protrusion 321 are stacked in a series in the positioning slot 72. As shown in FIG. 5, the third positioning protrusion 331 of the third optical film 33, the bottommost one in the successively stacked third positioning protrusion 331, the first positioning protrusion 311, and the second positioning protrusion 321, may further be adhered to the bottom of the positioning slot 72 via a double-sided adhesive tape 74. The topmost second positioning protrusion 321 of the second optical film 32 may further be secured in the positioning slot 72 via a tape 90. The first positioning protrusion 311 of the first optical film 31 between the third positioning protrusion 331 and the second positioning protrusion 321 is stacked in the middle without further securing method.

The second optical film 32 and the third optical film 33 are secured via the tape 90 and the double-sided adhesive tape 74 in the positioning slot 72 at the non light source side of the plastic frame 70, respectively, whereas the first optical film 31, in the middle of the optical films 30, is secured with the fixing protrusion 310 via the double-sided adhesive component 80 at the light source side 41. The first positioning protrusion 311 of the first optical film 31 is therefore securely fixed from falling out of the positioning slot 72 during an impact test or a falling test.

Figure 6:
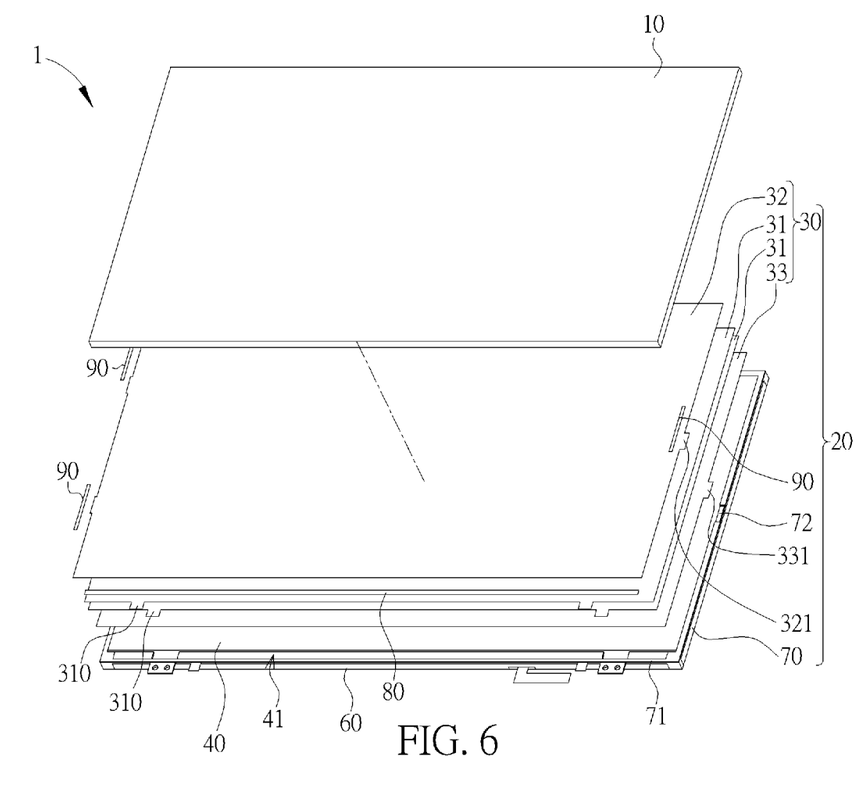
FIG. 6 and FIG. 7 are illustrations showing exploded views of displays according to another embodiments of the invention, in which the fixing protrusions of multiple first optical films are staggered with one another.
Figure 7:
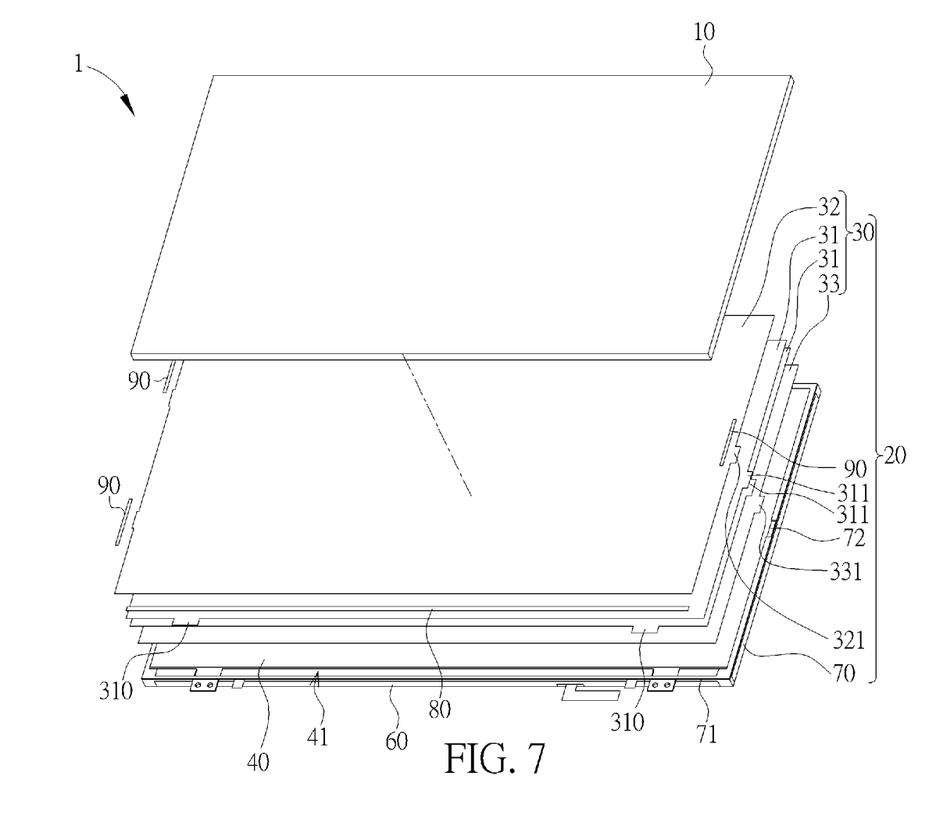

Besides the embodiments above, there can be multiple middle films implemented in other embodiments of the invention. Please refer to FIG. 6 and FIG. 7, which are illustrations showing exploded views of displays according to another embodiments of the invention, in which the fixing protrusions of multiple first optical films are staggered with one another. In addition to the topmost second optical film 32 and the bottommost third optical film 33, each secured in the positioning slot 72 of the plastic frame 70 via the tape 90 and the double-sided tape 74, the display 1 includes a plurality of first optical films 31 in the middle, each having a fixing protrusion 310 at the side corresponding to the light source side 41. These fixing protrusions 310 are staggered with one another and disposed in the opening 66 of the top plate 63. For example, FIG. 6 shows an embodiment depicting that the fixing protrusions 310 of two first optical films 31 are staggered with each other and disposed in the same opening 66; thus, each fixing protrusion 310 of two first optical films 31 is partially exposed from the opening 66 of the top plate 63. Therefore, as the double-sided adhesive component 80 is disposed between the display panel 10 and the top plate 63, it can adhere each fixing protrusion 310 of these first optical films 31 so that the plurality of the first optical films 31 can be secured. In other embodiments, the holder 60 may also have more than one system bracket 64 bent over at different positions of the top plate 63, each forming a corresponding opening 66 on the top plate 63. For example, the embodiment in FIG. 7 shows that the fixing protrusions 310 of two first optical films 31 are respectively disposed in one of these openings 66 and apparently staggered with each other; thus, each fixing protrusion 310 of two first optical films 31 is exposed from one of the openings 66 of the top plate 63. The fixing protrusions 310 are further secured by the double-sided adhesive component 80.

The embodiments of the invention provide a display with its backlight module including a plurality of optical films that have positioning protrusions disposed in the positioning slot of the plastic frame for correct installation of the optical films on the light guide plate. One or more middle optical films further include the fixing protrusion at the side corresponding to the light source and the existing opening formed by bending the system bracket out of the holder is provided for placement of the fixing protrusion of the middle optical films. The double-sided adhesive tape disposed between the display panel and the holder is further utilized for securing the fixing protrusion such that the middle optical films can be securely fixed and not falling apart during the impact test or the falling test.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A display, comprising:
  a display panel; and
  a backlight module, wherein the display panel is disposed thereon, the backlight module comprising:
    a light guide plate having a light source side;
    a light source disposed along the light source side of the light guide plate;
    a holder comprising:
      a bottom plate, on which the light source and the light guide plate are disposed;
      a side plate connected to the bottom plate and facing the light source side of the light guide plate;
      a top plate connected to the side plate and disposed substantially in parallel with the bottom plate, wherein the top plate, the side plate, and the bottom plate form a containing room where the light source and the light source side of the light guide plate are contained therein, and the top plate has an opening; and
      a system bracket connected to the side plate, the system bracket extending substantially in parallel with the bottom plate and toward a direction away from the light guide plate, and a position of the opening on the top plate substantially aligning with the system bracket; and a first optical film disposed between the display panel and the light guide plate, the first optical film comprising a fixing protrusion disposed in the opening of the top plate.

2. The display of claim 1, wherein the system bracket is formed by bending a portion of the top plate toward the direction away from the light guide plate and the opening is formed on the top plate at an original position being occupied by the portion before bending.

3. The display of claim 2, wherein the width of the system bracket near the side plate is not more than the width of the opening near the side plate.

4. The display of claim 1, further comprising a plastic frame disposed inside the holder and surrounding the light guide plate, wherein the plastic frame supports the display panel and has a positioning slot at a side not facing the light source side.

5. The display of claim 4, wherein the plastic frame comprises a top frame covering the top plate and exposing the opening.

6. The display of claim 4, wherein the backlight module further comprises a second optical film disposed between the display panel and the first optical film, and the second optical film comprises a second positioning protrusion disposed in the positioning slot.

7. The display of claim 4, wherein the first optical film comprises a first positioning protrusion disposed in the positioning slot.

8. The display of claim 4, wherein the backlight module further comprises a second optical film and a third optical film, the second optical film disposed between the display panel and the first optical film, the third optical film disposed between the first optical film and the light guide plate, wherein the third optical film, the first optical film, and the second optical film stack in a series on the light guide plate, wherein the second optical film comprises a second positioning protrusion and the third optical film comprises a third positioning protrusion respectively disposed in the positioning slot.

9. The display of claim 8, wherein the first optical film further comprises a first positioning protrusion disposed in the positioning slot.

10. The display of claim 9, wherein the second positioning protrusion of the second optical film is secured in the positioning slot via a tape and the third positioning protrusion of the third optical film is adhered to the bottom of the positioning slot via a double-sided adhesive tape.

11. The display of claim 1, further comprising a double-sided adhesive component disposed between the display panel and the top plate, wherein the double-sided adhesive component is utilized for securing the display panel with the top plate and the fixing protrusion of the first optical film.

12. The display of claim 1, wherein the backlight module further comprises a second optical film and a third optical film, the second optical film disposed between the display panel and the first optical film, the third optical film disposed between the first optical film and the light guide plate.

13. The display of claim 12, wherein the backlight module further comprises a fourth optical film disposed between the second optical film and the third optical film, the fourth optical film comprising a second fixing protrusion disposed in the opening of the top plate, wherein the fixing protrusion of the first optical film and the second fixing protrusion of the fourth optical film are both exposed by the opening of the top plate.

14. The display of claim 12, wherein the top plate further has a second opening and the backlight module further comprises a fourth optical film disposed between the second optical film and the third optical film, the fourth optical film comprising a second fixing protrusion disposed in the second opening of the top plate, wherein the fixing protrusion of the first optical film and the second fixing protrusion of the fourth optical film are respectively exposed by the opening and the second opening of the top plate.

* * * * *